Dec. 30, 1941.  C. L. HOWSE ET AL  2,267,920
FLUID TREATING APPARATUS
Filed March 30, 1938  3 Sheets-Sheet 1
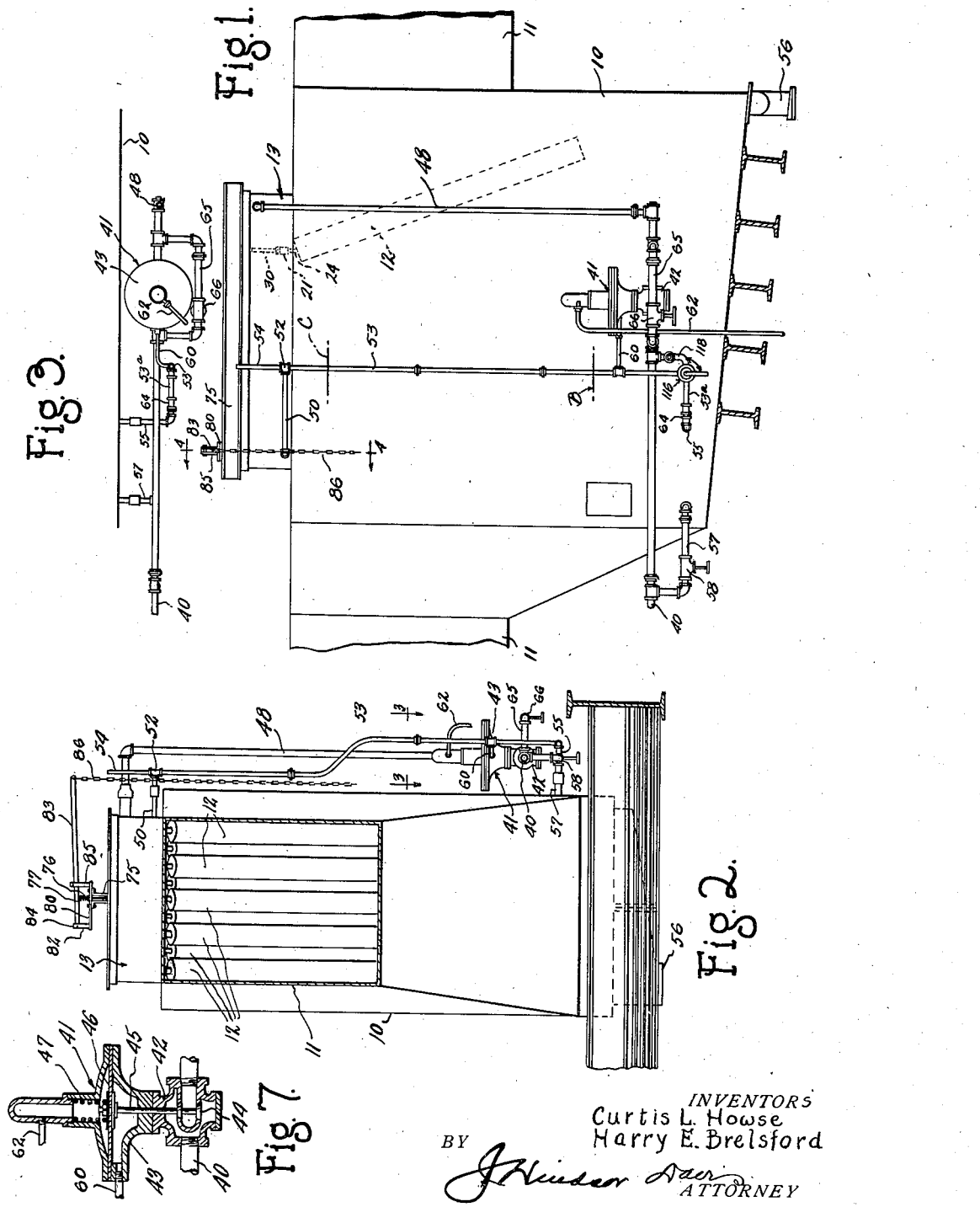
INVENTORS
Curtis L. Howse
Harry E. Brelsford
BY
ATTORNEY Dec. 30, 1941.   C. L. HOWSE ET AL   2,267,920
FLUID TREATING APPARATUS
Filed March 30, 1938   3 Sheets-Sheet 2
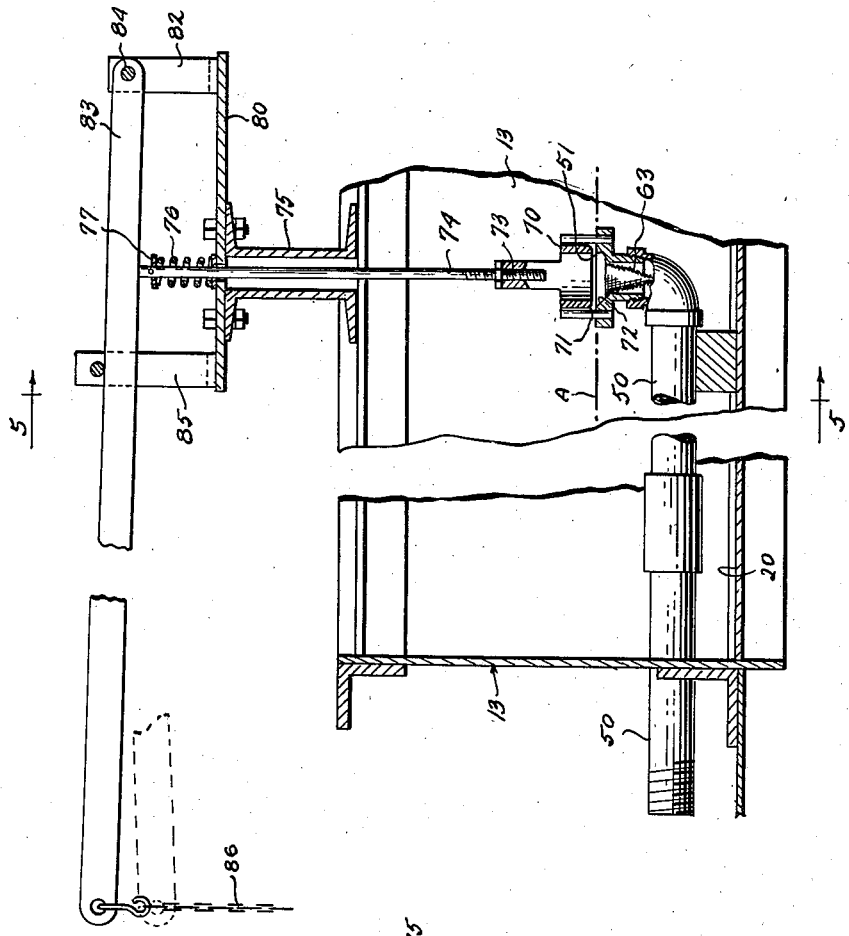
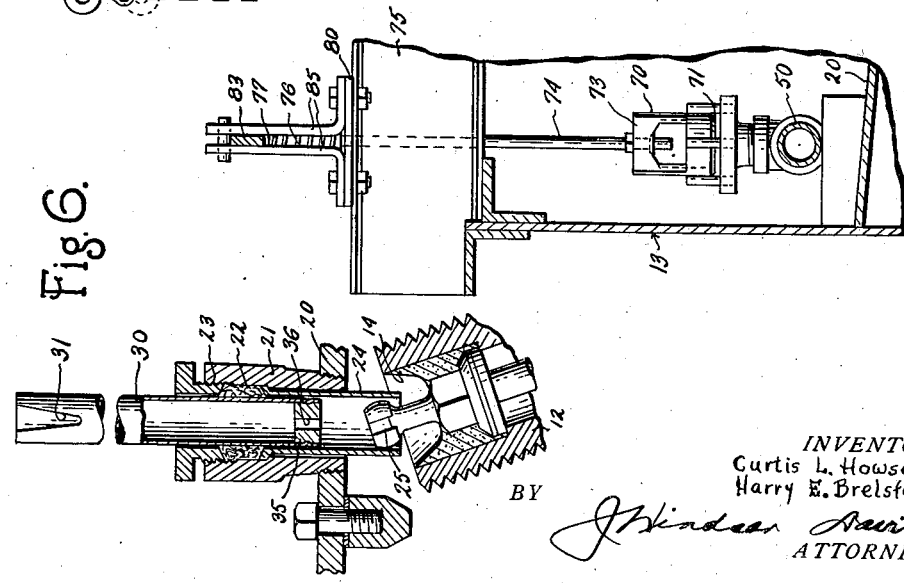
INVENTORS
Curtis L. Howse
Harry E. Brelsford
BY
ATTORNEY Dec. 30, 1941.  C. L. HOWSE ET AL  2,267,920
FLUID TREATING APPARATUS
Filed March 30, 1938  3 Sheets-Sheet 3
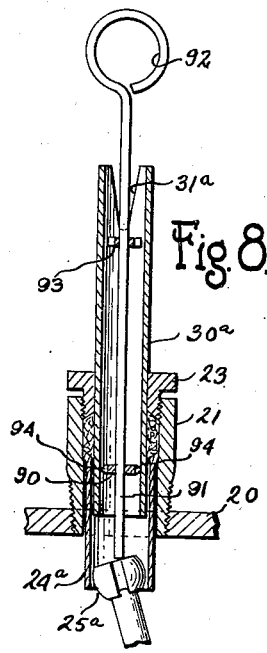
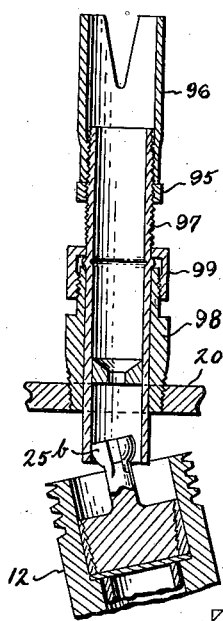
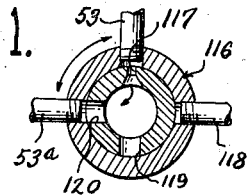
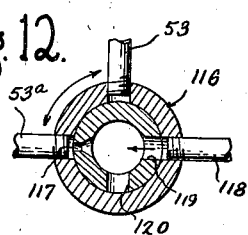
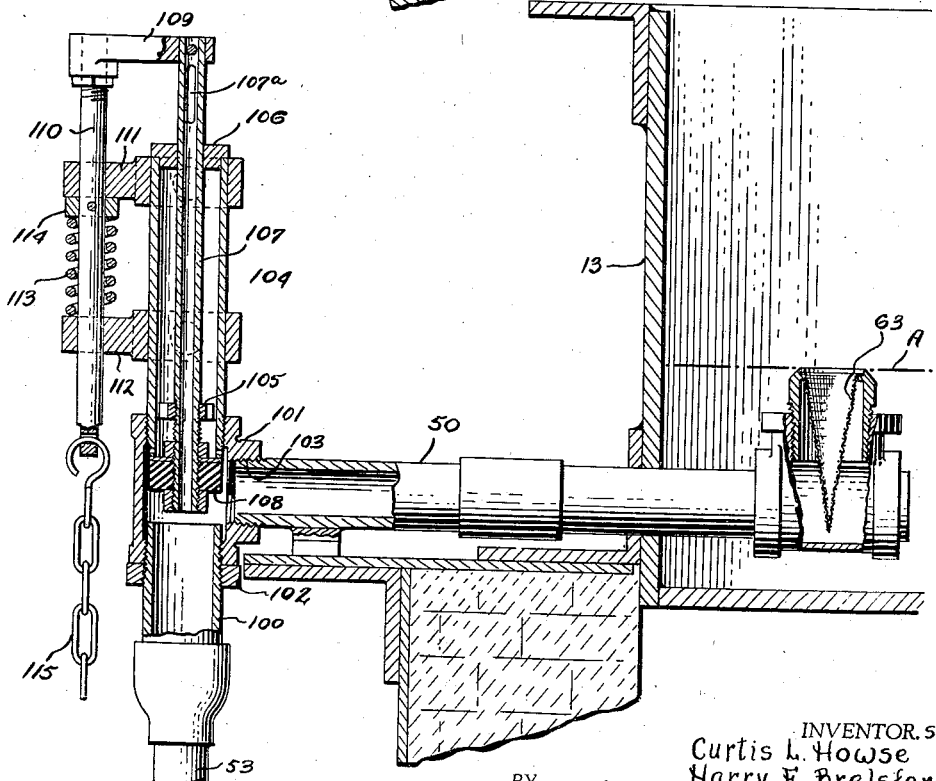
INVENTOR.S
Curtis L. Howse
Harry E. Brelsford
BY
ATTORNEY.S Patented Dec. 30, 1941

2,267,920

UNITED STATES PATENT OFFICE 2,267,920

FLUID TREATING APPARATUS

Curtis L. Howse and Harry E. Brelsford, Birmingham, Mich., assignors to Diamond Power Specialty Corporation, Detroit, Mich., a corporation of Michigan Application March 30, 1938, Serial No. 198,983

3 Claims. (Cl. 137—68)

This invention relates to a fluid treating apparatus of the type in which a fluid to be treated such, for example, as air or gas, is adapted to be contacted by a second fluid such, for example, as a liquid.

While not necessarily so limited, the invention will find particular utility in a construction in which furnace gases or the like are adapted to contact wetted surfaces on which the dust carried by the gases is collected so that the gases are discharged to the atmosphere or to a point of use substantially free from dust.

One of the primary objects of this invention is to insure a positive feed of the treating liquid to the baffle elements with which the gas comes in contact.

A further object of the invention is to provide an improved means for maintaining within narrow limits a liquid level in the tank which supplies liquid to the baffle elements.

Numerous other objects and advantages of this invention will become more apparent as the following description proceeds particularly when reference is had to the accompanying drawings wherein Fig. 1 is a semi-diagrammatic side elevational view of a fluid treating apparatus constructed in accordance with the teachings of this invention;

Fig. 2 is an end elevational view of the apparatus shown in Fig. 1;

Fig. 3 is a fragmentary horizontal sectional view taken substantially on the line 3—3 of Fig. 2;

Fig. 4 is a vertical sectional view taken substantially on the line 4—4 of Fig. 1;

Fig. 5 is a vertical sectional view taken substantially on the line 5—5 of Fig. 4;

Fig. 6 is a fragmentary sectional view of that portion of the fluid feeding system leading from the supply tank;

Fig. 7 is a sectional view through the regulator valve forming a part of the construction;

Fig. 8 is a fragmentary sectional view of a modified form of the fluid feeding construction;

Fig. 9 is a sectional view of a further modification of the fluid feeding construction;

Fig. 10 is a sectional view of a modified form of the liquid level varying construction;

Fig. 11 is a diametric section through the standpipe orifice and orifice cleansing means of Fig. 1, in one position, and Fig. 12 is a view similar to Fig. 11 with the parts in another relative position.

In fluid treating apparatuses of the type to which this invention relates, it is customary to flow the gas or air to be treated through a suitable casing in which are located baffle elements. These baffle elements are supplied with a liquid which flows over the outer surfaces of the elements, the liquid generally being supplied to the baffle elements from a suitable tank disposed above the casing through which the gas flows.

It often happens that the gas pressure in the baffle element casing is greater than atmospheric pressure with the result that there is a tendency for the gas in the baffle element casing to flow upwardly into the liquid tank rather than the liquid to flow down onto the baffle elements. It, therefore, constitutes a primary purpose of this invention to provide an improved means for insuring that under no circumstances will the pressure within the baffle element casing or gas passage be sufficient to prevent the flow of liquid from the liquid tank onto the baffle elements.

Referring first then to this portion of the invention and more particularly to the drawings wherein like reference characters designate corresponding parts throughout all views, the numeral 10 designates generally a baffle element casing which is interposed intermediate the ends of a gas passage 11. The gas passage may receive gas from any suitable source, generally from industrial furnaces or the like, while the baffle element casing 10 may be of any desired construction and supported in any desired manner. It will be apparent that when this casing is disposed intermediate the ends of the gas passage 11, it in substance constitutes a part of this gas passage.

Disposed within the casing 10 are baffle elements 12 which while they may be of any desired construction are illustrated in Fig. 6 of the drawings as being threaded so that a larger completely wetted surface will be exposed to the gas flowing through the casing. The baffle elements are preferably also inclined in the manner illustrated whereby liquid on the rear faces thereof will tend to flow to the front faces thereof, while additionally, the baffle elements are preferably arranged in rows within the casing, the elements in one row being staggered with reference to the elements in the next adjacent row to the end that the gas flowing through the casing must contact the outer surfaces of the elements.

For supplying a liquid such, for example, as water to the outer surfaces of the baffle elements, there is provided above the casing 10 and forming a part thereof, a liquid tank 13 which is supplied with a suitable dust collecting liquid in a manner which will hereinafter be more fully described. The baffle elements are preferably of substantial cross sectional area, and are provided in their upper ends with recesses 14 to which is supplied from the tank 13 a liquid overflowing the recesses and flowing down the sides of the baffle elements as will readily be apparent. If reference be made to Fig. 6 of the drawings, it will be noted that the top of the casing 10, which constitutes the floor of the tank 13, is designated by the reference character 20. This floor 20 is provided with a plurality of threaded openings, there being one disposed above each baffle element and in each opening there is threaded or otherwise suitably secured, a fitting 21 adapted to receive suitable packing 22 and a gland 23 which cooperates with the packing and the fitting to prevent the flow of liquid around the fitting down into the casing 10.

Suitably secured within the fitting 21 and depending therefrom into the casing 10 is a tube 24. This tube is located immediately above the baffle element 12 and the lower end of the tube is adapted to receive a notched knob 25 which is secured to and is carried by the upper end of the baffle element. The lower end of the baffle element is supported in any desired manner (not shown) and it will be understood that the knob 25 maintains the upper end of the element in proper position with respect to tube 24, while permitting the flow of liquid through the tube into the recess 14.

Also carried by the fitting 21 and projecting a predetermined distance above the same, is a tube 30 which communicates with the tube 24. The tube projects into the tank 13 and the upper end of this tube is notched as at 31 the depth of the notch determining the level which the liquid must reach in tank 13 before it flows into tube 30 and thus through tube 24 into the recess 14.

Disposed in the lower end of tube 30 is a restricting plug 35 provided with an orifice 36 through which the liquid must flow to enter the tube 24 and hence the recess 14. It is this orifice with a substantial head of liquid thereabove which prevents the gas in the casing 10, which is under pressure, from flowing upwardly through tubes 24 and 30 and into tank 13.

The orifice 36 performs its function by virtue of the fact that it is large enough to permit the necessary liquid to pass into the tube 24 under gravity flow and yet is small enough that a substantial head may be provided thereabove thereby permitting a pressure on the outlet thereof greater than the opposing pressure of the gas in the passage 10. The vertical extent of tube 30 above the orifice and thus the head of liquid in tube 30 will determine the pressure exerted by the liquid on the orifice 36 and it is contemplated that the element will be so arranged that this pressure of the liquid will sufficiently overbalance the gas pressure as to permit the proper flow of liquid into the recess 14 of the baffle element.

Fig. 8 discloses a modification of the fluid feeding construction wherein an externally notched disc 90 is carried by rod 91. This rod is of such length that when in normal position in tube 30ª its lower end will pass into tube 24ª and rest on knob 25ª while its upper end, terminating in loop 92, will project a desired distance above the upper end of tube 30ª. Rod 91 also carries a spider 93 so positioned vertically on the rod as to contact the walls of tube 30ª slightly below the notch 31ª. It will be apparent that spider 93 in conjunction with the notched disc 90 will serve to prevent lateral movement of the rod 91 and will maintain the rod in an upright position. Orifices 94 are provided on notched disc 90 and are sufficiently large to permit the necessary amount of fluid to pass into tube 24ª and yet small enough to restrict the gas flow as previously described; the effect being a plurality of relatively small orifices.

It will be apparent that the construction is such that should a baffle element be displaced or drop out of a feed tube 24ª then the rod 91, with the support of the knob 25 removed, will drop until the loop 92 engages the top of the tube 30 thus providing a visible indicator of the trouble within the casing 10. An additional advantage of this construction is that it provides an orifice construction easily removable for cleaning. This is accomplished by simply lifting rod 91 and the attached notched disc 90 and spider 93 from their position in the tube 30.

A further variation of this construction is shown in Fig. 9 where a check nut 95 and a notched tube cup 96 threadably engage the upper part of a tube 97 which extends into the casing top 20 to receive knob 25ᵇ. Fitting 98 and gland nut 99 cooperate to support tube 97 in its proper position in the top 20 and to prevent the flow of liquid around the fitting down into the casing 10. Adjustment of the level at which it is desired to have water admitted to each element is thus possible through the vertical movement of tube cup 96 and check nut 95.

As previously mentioned a feature of this invention is to provide means for maintaining a predetermined level of liquid in the tank 13. This is accomplished by controlling the supply of liquid to the tank by means of a regulator valve which in turn is controlled by the pressure resulting from a vertical head of water in an overflow pipe or standpipe, as will now be described.

Referring now more particularly to Figs. 1, 3 and 7, the numeral 40 designates a suitable liquid supply pipe which extends alongside the casing 10 adjacent the lower portion thereof. The liquid flowing through the supply pipe 40 is controlled by a suitable regulator valve 41, which comprises a valve casing 42 and a diaphragm casing 43. The valve casing includes valve members 44 and these valve members are carried by a stem 45 which is secured to a diaphragm 46 located in the diaphragm casing. A spring 47 disposed above the diaphragm tends to normally unseat the valve members 44 and thus to permit the liquid to flow from supply pipe 40 to vertical pipe 48 which discharges into the tank 13.

Leading into the tank 13 is a conduit 50 which has an upwardly directed open end 51 (Fig. 4) in the reservoir into which liquid will flow with the result that normally the liquid in tank 13 will be maintained at level A, as shown in Fig. 4. A suitable strainer 63 is suspended in the open upper end 51 in such a manner as to be easily removable for cleaning.

The pipe 50 is extended outside of the tank 13 and communicates by way of a fitting 52 with a vertical standpipe 53. The vertical standpipe is provided above the fitting 52 with an extension 54 which opens to the atmosphere to permit air which might be trapped in the vertical standpipe to escape.

At its lower end the pipe 53 is arranged to discharge at 55 into the bottom of casing 10.

The liquid from the baffles 12 also drains into the bottom of the casing. It will be noted, Fig. 1, that the bottom of the casing is inclined so that the liquid therein will flow by gravity to a suitable discharge pipe 56 and in order to flush the bottom of the casing 10 there may be provided a branch conduit 57 which discharges into the bottom of casing 10 at the end thereof opposite from the discharge conduit 56. The conduit 57 communicates with the supply pipe 40 and is provided with a suitable valve 58 whereby the supply of flushing liquid to the bottom of the casing may be controlled.

It will be noted that the regulator valve 41 is disposed above the lower end of the standpipe 53 and there is provided a branch conduit 60 which communicates with the standpipe 53 and with the diaphragm casing below the diaphragm so that the pressure of the head of water in the standpipe acts on the diaphragm against the force exerted on the latter by the spring 47. The diaphragm casing is preferably provided with a drain 62 which communicates with an extension of the casing above the diaphragm so that in the event that the diaphragm should become ruptured the liquid discharged from the standpipe will be conducted to a suitable point of disposal.

When liquid is supplied to the tank 13 sufficiently to overflow the inlet to the pipe 50, it will be apparent that there will be a flow of liquid into the standpipe 53. As its lower end and just before the standpipe 53 discharges into the casing 10, the standpipe is provided with a suitable restriction or orifice 64, of either a fixed or variable type, which limits the amount of liquid escaping from the standpipe into the bottom of the casing.

The arrangement is such that the liquid flowing into the end 51 of conduit 50 equals the liquid flowing out of the standpipe through orifice 64. The parts are so designed that should the level of the liquid in the standpipe drop to the point indicated by the line B (Fig. 1), the regulator valve will be opened wide thus admitting more liquid to the line 48 and hence to the tank 13 to restore the liquid therein to the desired level. On the other hand, should the level of the liquid in the standpipe rise above a point indicated by the line C, the regulator valve will be closed by the pressure resulting from the head of liquid in the standpipe, thus cutting off the supply of liquid to the tank 13. Should the level of the liquid in the standpipe reach any intermediate position between points B and C, the regulator valve will be opened a proportional amount with the result that the liquid in the tank 13 will be constantly maintained at the level A (Fig. 4). The diameter of standpipe 53 may be varied to change the sensitiveness of the control, a smaller diameter giving a quicker response, hence a more constant level and a larger diameter, a more sluggish response. The liquid level will thus be maintained approximately at the level A, this level corresponding to the bottom of the slot 31. The tube 30 is always maintained filled with liquid thus providing a liquid pressure on the tube outlet 36 in excess of the possible maximum operating pressure of the gas in the casing 10. For manually admitting liquid to the tank 13 in the event of failure of the regulator valve to operate, there may be provided a suitable by-pass 65 around the regulator valve, this by-pass being manually controlled by a valve 66.

In some instances, notably where the liquid used contains solid matter which is apt to plug up the orifice 64, it has been found expedient to provide an orifice which is quickly and easily cleaned. Figs. 11 and 12 show diagrammatically a structure for accomplishing this result. A three-way valve 116 containing orifice 117, corresponding to the orifice 64, is connected to the standpipe 53 and the drain pipe 53ª. Also communicating with valve 116 is line 118 which carries under pressure any convenient and suitable flushing fluid. This line 118 may, for instance, be attached to a city water main. The valve 116 is further provided with openings 119 and 120 and is operated in the usual manner by a projecting handle by which it may be rotated about its own axis. In its operating position (Fig. 11) the cleaning liquid flows into valve 116 by way of the orifice 117 and out the opening 120 into the line 53ª. To clean the orifice the valve is rotated in a counter-clockwise manner until it is in the position shown in Fig. 12. In this position any solid matter deposited on the orifice 117 is forced further along pipe 53ª by virtue of the imposition of increased pressure by the fluid in the line 118, and thence into the casing 10. Still further counter-clockwise rotation of the valve through 90° closes off the drain pipe 53ª and permits the standpipe to be blown out if such should be desired.

It constitutes a still further object of this invention to provide a means whereby the normal level of liquid in tank 13 may be varied, if desired. The structure for accomplishing this result is disclosed more clearly in Figs. 4 and 5 wherein the reference character 70 designates a tubular member having at its lower end a beveled portion 71 adapted to seat on a corresponding beveled portion 72 of the open end 51 of the pipe 50. It will be apparent that when the tubular member 70 is lowered into engagement with the valve seat or beveled portion 72, the liquid must flow over the top of the tubular member before it enters tube 50 thus raising the normal level of the liquid in tank 13.

The tubular member 70 is provided at its upper end with a yoke 73 to which an actuating rod 74 is secured, the rod being adjustable to vary its vertical relation with the yoke. The rod 74 extends upwardly through a tubular support 75, which is carried by the upper end of the tank 13, and is normally urged upwardly by a spring 76 which engages a collar 77 secured to the rod.

Member 75 supports a platform 80 which carries at its one end an upright 82 to which a lever 83 is pivoted as at 84. The lever is adapted to engage the upper end of the stem 74 and is guided in its pivotal movement by guide members 85 which are also carried by the platform 80.

At its free end the lever 83 is provided with a chain 86 and it will be apparent that when the chain is pulled downwardly so that the lever assumes the position shown in dotted lines in Fig. 4 the tubular member 70 will be lowered into engagement with the valve seat 72, thus raising the normal level of the liquid in tank 13. Any suitable means (not shown) may be utilized for securing the chain 86 in its downwardly pulled position so as to maintain the higher level of the liquid in the tank 13, although normally the lever 83 is actuated to raise the level of the liquid in the tank 13 only momentarily thus increasing the head of water acting on tubes 30 to effect a flushing of the baffle elements 12. It will be apparent that whenever the chain 86 is released, the spring 76 will return lever 83 and tubular member 70 to the positions shown in Fig. 4, permitting the level of the liquid in tank 13 to return to height A.

Fig. 10 shows a modification of the liquid level-varying construction. In the open end of pipe 50 a suitable cone-shaped wire strainer 63 is suspended in such a manner that it can be easily removed. Pipe 50 projects through the side of tank 13 and communicates with the pipe 100 and standpipe 53 by way of one of the openings 103 in the T fitting 101. Lock nut 102 is carried by pipe 100. Above the fitting 101 a tube 104 is provided as an extension of the standpipe 53 and pipe 100. Disposed in tube 104 and supported by guide member 105 and end plug 106 is valve tube 107. Carried at the lower end of the valve tube 107 and arranged to seat on the upper end of pipe 100 is valve member 108. Valve tube 107 being open at both ends, air, which might otherwise be trapped in standpipe 53 can always escape to the atmosphere either by traveling the length of the tube or by venting through a slot 107ª near the upper end thereof. Joined to the valve tube by connecting member 109 is an actuating rod 110 which is vertically supported by guides 111 and 112 attached to and projecting from tube 104.

A compression spring 113 reacts between the collar 114 attached to rod 110 and guide 112, the guide 112 being vertically adjustable on the pipe 104 to vary the compression of the spring. Attached to the lower end of rod 110 and depending therefrom is a chain 115.

As will be readily apparent when chain 115 is pulled downardly against the spring 113 which normally holds valve 108 in its open position, the valve is forced to its seat on the upper end of pipe 100 thereby shutting off the flow of liquid from the pipe 50 into the standpipe 53. As the head in the standpipe falls valve 44 of the regulator 41 is opened wider and there being no drainage by way of pipe 50 from tank 13 the level in the tank is raised. This increases the head acting on tubes 30 and hence effects a flushing of the baffles 12. If it is desired to raise the head on the pipe 30 for any extended length of time this can be accomplished by elevating the end of the pipe 100 by rotation thereof in its threaded seat.

From the above it will be apparent that the invention provides means whereby liquid will be supplied to the baffle elements even though the pressure of the gas flowing through the casing 10 is greater than atmospheric pressure. Further it will be apparent that the invention provides a means whereby the level of the liquid in the tank 13 may be maintained at a predetermined desired normal level but may be varied, when desired, for the purpose of flushing the exterior surfaces of the baffle elements.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What we claim as our invention is:

1. A liquid level control device comprising a reservoir having a source of supply of liquid, a horizontally disposed conduit disposed in said reservoir, said conduit having an upwardly extending open end communicating with the reservoir at a predetermined level therein, a stand pipe communicating with said conduit, means providing a restricted drain for said stand pipe, means controlled by the level of the liquid in said stand pipe for controlling the flow of liquid to said reservoir, a tubular element engageable with the open end of said conduit for varying the level at which said conduit communicates with the reservoir, means normally maintaining said tubular element out of engagement with the open end of the conduit, and means operable to move said tubular element into engagement with the open end of said conduit.

2. A liquid level control device comprising a reservoir having a source of supply of liquid, a horizontally disposed conduit disposed in said reservoir, said conduit having an upwardly extending open end communicating with the reservoir at a predetermined level therein, a stand pipe communicating with said conduit, means providing a restricted drain for said stand pipe, means controlled by the level of the liquid in said stand pipe for controlling the flow of liquid to said reservoir, a tubular element engageable with the open end of said conduit for varying the level at which said conduit communicates with the reservoir, means normally maintaining said tubular element out of engagement with the open end of the conduit, slidable guide means for insuring alining fit of said tubular element over the end of said stand pipe upon lowering thereof, and means operable to move said tubular element into engagement with the open end of said conduit.

3. A liquid level control device comprising a reservoir having a source of supply of liquid, a horizontally disposed conduit disposed in said reservoir, said conduit having an upwardly extending open end communicating with the reservoir at a predetermined level therein, a stand pipe communicating with said conduit, means providing a restricted drain for said stand pipe, means controlled by the level of the liquid in said stand pipe for controlling the flow of liquid to said reservoir, a tubular element engageable with the open end of said conduit for varying the level at which said conduit communicates with the reservoir, means normally maintaining said tubular element out of engagement with the open end of the conduit, slidable guide means for insuring alining fit of said tubular element over the end of said stand pipe upon lowering thereof, and manual means operable from a point remote from said reservoir for selectively moving said tubular element into or out of engagement with the open end of said conduit.

CURTIS L. HOWSE.
HARRY E. BRELSFORD.